(12) United States Patent
Stevens

(10) Patent No.: US 8,264,701 B2
(45) Date of Patent: Sep. 11, 2012

(54) PRINTING GRAPHICS WITH TRANSPARENCY ON A POSTSCRIPT ENABLED IMAGE FORMING DEVICE

(75) Inventor: Michael T. Stevens, Aloha, OR (US)

(73) Assignee: Xerox Corporation, Norwalk, CT (US)

( * ) Notice: Subject to any disclaimer, the term of this patent is extended or adjusted under 35 U.S.C. 154(b) by 608 days.

(21) Appl. No.: 12/542,756

(22) Filed: Aug. 18, 2009

(65) Prior Publication Data
US 2011/0044535 A1 Feb. 24, 2011

(51) Int. Cl.
G06F 3/12 (2006.01)
G09G 5/02 (2006.01)

(52) U.S. Cl. ...... 358/1.13; 358/1.9; 358/1.15; 358/1.18; 358/1.16; 358/1.17; 345/592; 345/619; 345/629; 345/630

(58) Field of Classification Search .......... 358/1.1–1.18; 345/619, 592, 629, 630, 634; 715/209
See application file for complete search history.

(56) References Cited

U.S. PATENT DOCUMENTS

| | | | |
|---|---|---|---|
| 5,687,303 A * | 11/1997 | Motamed et al. | 358/1.18 |
| 6,230,174 B1 * | 5/2001 | Berger et al. | 715/201 |
| 6,289,364 B1 * | 9/2001 | Borg et al. | 715/209 |
| 6,421,460 B1 | 7/2002 | Hamburg | |
| 7,181,687 B2 | 2/2007 | Bourdev | |
| 7,209,258 B1 | 4/2007 | Markovic et al. | |
| 7,256,798 B2 * | 8/2007 | Bourdev et al. | 345/619 |
| 7,385,727 B1 | 6/2008 | Markovic et al. | |
| 7,433,103 B2 | 10/2008 | Edge | |
| 7,505,046 B1 * | 3/2009 | Louveaux | 345/619 |
| 7,969,604 B2 * | 6/2011 | Markovic | 358/1.16 |
| 2007/0121131 A1 * | 5/2007 | Hauser | 358/1.9 |
| 2007/0268505 A1 * | 11/2007 | Smith | 358/1.13 |
| 2008/0074439 A1 | 3/2008 | Parenteau et al. | |

OTHER PUBLICATIONS

Adobe Whitepaper: "A Designer's Guide to Transparency for Print Output," pp. 1-34.
Adobe Whitepaper: "Transparency in Adobe Applications: A Print Production Guide," pp. 1-58.
Adobe PostScript 3: "DeviceN Color Space and Color Model," *Adobe® Developers Association*, Technical Note #5604, LanguageLevel 3, Oct. 9, 1997, pp. 1-23.

* cited by examiner

*Primary Examiner* — Twyler Haskins
*Assistant Examiner* — Dennis Dicker
(74) *Attorney, Agent, or Firm* — Philip E. Blair; Fleit Gibbons Gutman Bongini & Bianco P.L.

(57) ABSTRACT

What is disclosed is a novel system and method for emulating transparency in a PostScript-enabled image forming device, such as a PostScript-enabled print device. The present system and method uses Adobe's DeviceN color space to support transparency printing on PostScript-enabled devices. The present method uses abstract data represented by a color plane in DeviceN space to indicate the existence of a transparency layer in the image to be printed. An emulation procedure is then called to perform a color space transformation and to perform color blending of the first image into the second image. A transparency value is used as one of the colorant channels to define the blending. Advantageously, the present method is backward compatible as there is no update required to the printer's driver or firmware. The present method has been demonstrated to work with Adobe Reader and PostScript Level-3.

16 Claims, 9 Drawing Sheets

```
%!

32 dict begin                              % temp dict
/; { systemdict exch get } bind def /convert_rgb_to_cmyk % r g b => c m y k
{
 1.0 /exch ; /sub ; 3 1 /roll ;
 1.0 /exch ; /sub ; 3 1 /roll ;
 1.0 /exch ; /sub ; 3 1 /roll ;

3 /copy ;
  2 /copy ; /gt ; { exch } bind /if ; /pop;
  2 /copy ; /gt ; { exch } bind /if ; /pop;
 /dup ; 0.6 /mul ; 1.0 /exch ; /sub ;
 5 -1 /roll ; 1 /index ; /mul ;
 5 -1 /roll ; 2 /index ; /mul ;
 5 -1 /roll ; 3 /index ; /mul ;
 5 -2 /roll ; /pop ;
} bind def /blend_4 % v0 v1 v2 v3 b0 b1 b2 b3 T => v0´ v1´ v2´ v3´
{
 9 5 /roll ;                     % b0 b1 b2 b3 T v0 v1 v2 v3
 5 /index ; 5 /index ; /mul ; /add ; 9 1 /roll ; % v3 b0 b1 b2 b3 T v0 v1 v2
 5 /index ; 4 /index ; /mul ; /add ; 9 1 /roll ; % v2 v3 b0 b1 b2 b3 T v0 v1
 5 /index ; 3 /index ; /mul ; /add ; 9 1 /roll ; % v1 v2 v3 b0 b1 b2 b3 T v0
 5 /index ; 2 /index ; /mul ; /add ; 9 1 /roll ; % v0 v1 v2 v3 b0 b1 b2 b3 T
 /pop ; /pop ; /pop ; /pop ; /pop ;
} bind def
```

FROM
FIG. 7B
↑

[
/DeviceN

[
(Red 1)
(Green 1)
(Blue 1)
(Transparency 1)
(Cyan 2)
(Magenta 2)
(Yellow 2)
(Black 2)
(Transparency 2)
]

/DeviceCMYK

[
0.0 0.0 0.0 0.0          % r1 g1 b1 T1 c2 m2 y2 k2 T2 c m y k

13 -3 /roll ;             % T1 c2 m2 y2 k2 T2 c m y k r1 g1 b1
 convert_rgb_to_cmyk         % T1 c2 m2 y2 k2 T2 c m y k c1 m1 y1 k1
14 -1 /roll ;            % c2 m2 y2 k2 T2 c m y k c1 m1 y1 k1 T1
blend_4                     % c2 m2 y2 k2 T2 c m y k 9 -5 /roll ;               % c m y k c2 m2 y2 k2 T2
blend_4                          % c m y k

FIG. 7B

```
    ] cvx

] setcolorspace end                                      % temp dict

/inch { 72 mul } bind def 16 dict begin
   /ImageType        1 def
   /Width          100 def
   /Height         100 def
   /BitsPerComponent   8 def
   /ImageMatrix     [ 6 inch Width div 0
             0 2 index neg
             2.5 inch 0.5 mul 9.0 inch ] matrix invertmatrix def
   /DataSource    currentfile /ASCIIHexDecode filter def
   /Decode        [ 9 { 0 1 } repeat ] def
currentdict end { image showpage } exec 926246004b90ba1dff99694d00478bb517ff92624600468cb917ff8b5b3f004a94c01eff906046
00498fc21dff96684e00467fc613ff9164450044 80c212ff90653d004785c616ff91663a004582
... more hex encoded binary image data ...
```

FIG. 8

PRINTING GRAPHICS WITH TRANSPARENCY ON A POSTSCRIPT ENABLED IMAGE FORMING DEVICE

TECHNICAL FIELD

The presently disclosed embodiments are directed to systems and methods for printing graphical files with transparency on a PostScript-enabled image forming device, such as a printer.

BACKGROUND

Portable Document Format (PDF) is a file format created by Adobe® Systems for document exchange. PDF is used for representing two-dimensional documents in a manner independent of the application software, hardware, and operating system. Among the features supported by PDF is transparency. Basic transparency is an effect that lets the viewer see through an object. End-users can specify the transparency attributes of selected page items. Opacity is the converse of transparency. Each is typically expressed as a percentage, where 0% relates to completely clear, i.e. not transparent, and 100% relates to completely opaque, i.e. completely invisible to the end-user. Page items can have individual opacities assigned to them. Blending mode defines how the background (backdrop) and foreground (source) colors interact.

Starting with version 1.4 of the PDF standard, transparency, (including translucency), is supported. This is a very complex model, requiring over 100 pages to document. A key source of complication is that PDF files may contain objects with different color spaces, and blending such objects can be difficult. PDF supports many different blend modes, not just the most common averaging method. In addition, rules for compositing many overlapping objects allow choices, such as whether a group of objects are to be blended before being blended with the background, or whether each object in turn is to be blended into the background.

PostScript®, a registered trademark of Adobe® Systems, is a page description programming language created by Adobe for the electronic and desktop publishing areas. PostScript is the language used for driving a wide variety of commercially available laser printing devices. The PostScript language does not inherently support transparency. This presents a problem with printing PDF files on a PostScript-enabled printing device.

Accordingly, what is needed is in this art are increasingly sophisticated systems and methods which emulating transparency in a PostScript-enabled printer.

BRIEF SUMMARY

What is disclosed is a novel system and method for emulating transparency in a PostScript-enabled image forming device, such as a printer. The present method operates when a first image is an imageable substrate, such a paper substrate, upon which a second image is to be blended. The present system and method utilizes Adobe's DeviceN color space to support transparency printing on PostScript-enabled devices. Abstract data represented by a color plane in DeviceN space is used to indicate the existence of a transparency layer in the image. An emulation procedure is then called to perform a color space transformation (flattening) and to perform color blending (blending) of the first image into the second image. A transparency value is used as one of the colorant channels to define the blending. Advantageously, the present method is backward compatible with a wide variety of PostScript-enabled devices as there are no updates required to the device's driver or any of the firmware. The present system and method provides a cost effective solution to the problem of handling transparencies using a PostScript operator. The method has been demonstrated to work with Adobe Reader and PostScript Level-3.

In one embodiment, the present method for emulating transparency in a PostScript-enabled image forming device involves performing the following. A first image and a second image to be blended together are received. Two or more colorant channels are also received from an application for forming an image on a PostScript-enabled device. At least one of the received colorant channels is a transparency value used for blending in DeviceN color space of PostScript. Custom PostScript code is created for flattening and blending the first image into the second image on the device. The PostScript code is then sent to the PostScript-enabled device to perform the flattening and blending.

Other features and advantages of the above-described system and method will become more readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIGS. 7 and 8 provide example PostScript code implementing the method of the flow diagram of FIG. 4.

DETAILED DESCRIPTION

Figure 1:
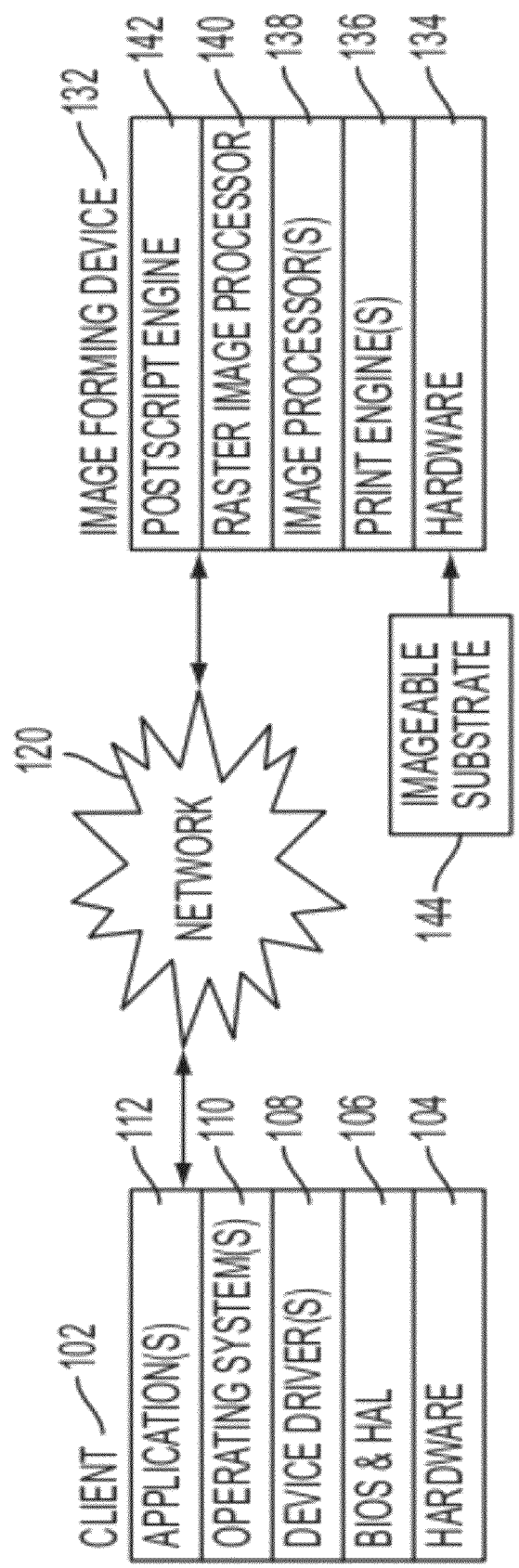
FIG. 1 is an example block diagram of functional components of an information processing system, such as a computer, communicating with an image forming device.

What is disclosed is a novel system and method for emulating transparency in a PostScript-enabled image forming device, such as a printer. The present method operates when a first image is an imageable substrate, such a paper substrate, upon which a second image is to be blended. It should be understood that the embodiments described herein are only examples of the many advantageous uses of the innovative teachings herein.

It should also be understood that one of ordinary skill in this art would be readily familiar with color, imaging, color management, and other related techniques and algorithms commonly found in the art of xerography. One of ordinary skill in this art would also be readily familiar with systems, software, and programming sufficient to implement the following functionality and capabilities as described in detail herein in their own system environments without undue experimentation.

Transparency in PostScript

Transparency is an effect applied to an object that causes it to appear transparent. A transparent object lets objects that lie underneath it to show through. Opacity is the converse of transparency. Transparency attributes of selected page items can be user-specified. Each transparency attribute is typically expressed as a percentage, where 0% relates to completely clear, i.e. not transparent, and 100% relates to completely opaque, i.e. completely invisible to the end-user. Page items can have individual opacities assigned to them. Blending mode defines how the background (backdrop) and foreground (source) colors interact. Transparency in Adobe publishing applications is referred to as either "live" (editable, interactive with underlying objects, or both) or "flattened". The transparency attributes of objects created in Adobe publishing applications stay "live" and fully editable while in their native Photoshop CS3, Illustrator CS3, or InDesign CS3 format. That same transparency remains live, but not editable, when placed or imported into non-native applications that support the native file format (such as PDF 1.4, 1.5, 1.6, and 1.7). In order to keep your workflow as flexible as possible, one must keep the transparency live as long as possible until the final output (up to and including flattening in the RIP) so you take advantage of transparency's device independence (as vector art rather than raster images with fixed resolution); how easily it can be edited; and the ability to make last-minute production decisions without worrying about settings used for previously flattened items. Transparency is flattened when a file containing live transparency is converted into a format that doesn't support live transparency, or the file is printed.

The PostScript language has limited support for full (not partial) transparency, depending on the PostScript level. On the other hand, PDF supports transparency. This presents a problem with printing PDF files on a PostScript-enabled printer. Although the embodiments hereof have been described with respect to the PostScript language, it should be clearly understood that the scope of the appended claims encompass any page description language (or software or hardware emulation thereof) which manipulates color in Adobe's DeviceN color space.

Level-1 PostScript implements transparency where a one-bit (monochrome) image can be treated as a mask. In this case the 1-bits can be painted any single color, while the 0-bits are not painted at all. This technique cannot be generalized to more than one color, or to vector shapes. Clipping paths can be defined. These restrict what part of all subsequent graphics can be seen. This can be used for any kind of graphic, however in Level-1, the maximum number of nodes in a path was often limited to 1500, so complex paths (e.g. cutting around the hair in a photograph of a person's head) often failed.

Level-2 PostScript adds no specific transparency features. However, by the use of patterns, arbitrary graphics can be painted through masks defined by any vector or text operations. This is, however, complex to implement. In addition, this too often has reached implementation limits, and few, if any, application programs ever offered this technique.

Level-3 PostScript adds a further transparency option for any raster image. A transparent color, or range of colors, can be applied; or a separate 1-bit mask can be used to provide an alpha channel.

Encapsulated PostScript (EPS) is an extension of the PostScript graphics file format developed by Adobe Systems. EPS is used for PostScript graphics files that are to be incorporated into other documents. An EPS file includes special PostScript comments called "pragmas" which provide information such as the bounding box, page number and fonts used. EPS files contain PostScript code, which may be Level 1, 2 or 3, and make use of the features above. On some computers, EPS files include a low resolution version of the PostScript image. A more subtle issue arises with the previews for EPS files that are typically used to show the view of the EPS file on screen. There are viable techniques for setting transparency in the preview. For example, a TIFF preview might use a TIFF alpha channel. However, many applications do not use this transparency information and will therefore show the preview as a rectangle. A semi-proprietary technique, pioneered in Photoshop and adopted by a number of pre-press applications, is to store a clipping path in a standard location of the EPS, and use that for display. In addition, few of the programs that generate EPS previews will generate transparency information in the preview. Some programs have sought to get around this by treating all white in the preview as transparent, but this too is problematic in the cases where some whites are not transparent. More recently, applications have been appearing that ignore the preview altogether; they therefore get information on which parts of the preview to paint by interpreting the PostScript.

The embodiments disclosed herein provide a novel method of supporting transparency within the existing Level-3 framework. No changes to the compiled code are required. As such, the present method is backwards compatible on any existing PostScript-enabled image forming device.

The interested reader hereof is respectfully directed to the following Adobe publications: "*A Designer's Guide to Transparency for Print Output*", and "*Transparency in Adobe Applications: A Print Production Guide*", each of which, as of the filing date hereof, are freely available for download from Adobe's website [www.adobe.com], and are hereby incorporated in their entirety by reference.

DEFINITIONS

The term "Colorant Channel", as used herein, refers to any channel in a given color space. Example color spaces include RGB, CMYK, CIE Lab, calibrated device space, calibrated RGB, pantone, and spot color.

"DeviceN color space" or "DeviceN color space model" is a feature of Adobe's PostScript language which allows developers to specify and render four or more device-dependent colors.

"PostScript-enabled device" refers to an image forming device, such as a printer, with an engine capable of executing machine executable program code written in the PostScript page description programming language.

"Transparency Value" is a value set by an application between two or more images. Each image is sometimes considered a layer with higher number layers typically being closer to a point of view to an observer, and lower number layers further from the point of view of an observer. One of the images can be a printable substrate.

"Flatten" is the process of replacing low-resolution or omitted image data with high resolution image data. Flattening occurs in a PDF to PS conversion because PostScript does not support full transparency and is not needed in a PDF RIP as PDF supports transparency. Since printing to a CMYK PostScript-enable printer requires separation, a layered/transparent PDF has to be flattened in advance of separation.

A "Transparency Flattener" (or "Flattener") is a software component of Adobe applications such as Illustrator, InDesign, and Acrobat 8 Professional, that processes objects with live transparency effects, along with objects with which they interact, and recreates their visual appearance by using opaque objects that can be rendered in the PostScript imaging model. The Transparency Flattener breaks up parts of the image that overlap transparent areas, into smaller opaque regions to simulated the transparent effects; clips overlapping regions of transparency into smaller groups; or simply rasterizes (RIPs) the artwork into a bitmap. The Transparency Flattener processes both objects that are a source of transparency and those that interact with transparency, possibly changing their composition in the output. When flattening transparency that interacts with spot colors, the Flattener may use overprinting to render the proper result (opaque objects simulate transparent effects). The Transparency Flattener uses CMYK or RGB color space in performing its color calculations.

A Transparency is flattened when a file containing live transparency is "converted" into a format that doesn't support live transparency or the file is printed. This conversion is the job of the Flattener. During flattening, transparent objects are replaced with objects that are visually equivalent to the transparent originals, but that contain no transparency. These new objects are often referred to as "flattened transparency". A flattened transparency does not contain any live transparent elements and, therefore, cannot be manipulated. An object that has had a transparency effect applied to it is referred to as a "source of transparency". A source of transparency is any object that has one or more of the following characteristics: opacity less than 100%; non-Normal blending mode; drop shadow; or feather.

An object (or placed file) that appears beneath a source of transparency interacts with transparency regardless of the layer it was placed on. An object is a source of transparency if it has any of the following:

An opacity of less than 100%.
Any blending mode other than Normal.
An opacity mask (Illustrator).
A drop shadow or feather.
An inner glow or outer glow effect or other live effects.
A fill or stroke with a style, brush, pattern, or filter effect that has any of the previous properties.

In addition, an object is a source of transparency if it is one of the following placed files:

Photoshop (native, PDF, or TIFF) file with a transparent background.
Illustrator (native or PDF) file that contains one or more objects with any of the previous properties In general, an object interacts with transparency if it is: a source of transparency; overlapped by a source of transparency; or is very close to a source of transparency and beneath it in stacking order (including objects on other layers). The stacking order is the front-to-back or top-to-bottom order of objects on a page, both within and between layers.

To "blend" transparent objects together, the Flattener uses a single color space (RGB or CMYK) for the blending (called the "Transparency Blend Space" (or simply, "blend space"). This blending space enables objects of multiple color spaces to blend when interacting transparently. The Transparency Blend Space is used when blending colors of transparent objects. The colors of the transparent objects are converted to a common color space using either the CMYK or RGB color profile for the document. To avoid unintended color shifts during flattening, it is important to properly set the Transparency Blend Space. The blend space may be either the RGB or CMYK document color space. For example, if the Transparency Blend Space is CMYK, the color space profile used is the one defined as the document's CMYK working space. If a document is not being color-managed, a generic RGB or CMYK color profile is assigned to the document color space. The color conversions performed by the Flattener augment the conversions performed at output. When a job that contains live transparency is printed (or exported to a file format that doesn't support live transparency), both the Flattener and the application's print engine may convert colors. The printer may further perform additional color conversions.

"Transparency interaction" is the relationship between a source of transparency and any other object that is a source of transparency, is overlapped by a source of transparency, or is very close to (usually within one point of) a source of transparency, and is beneath it in stacking order.

An "image" refers to a spatial pattern of physical light comprised of known colors of the light spectrum, which are visible by the human eye. When reduced to capture or rendering, the image generally comprises a plurality of colored pixels. A printed image (or image print) would be a photograph, plot, chart, and the like, as are generally known. When an image is rendered to a memory or storage, the values of the color pixels are generally stored in any of a variety of known formats such as BMP, JPEG, GIF, TIFF, or other formats employed for storing image data on a storage media for subsequent retrieval. Received pixels of an input image are associated with a color value defined in terms of a color space, comprising typically of 3 color coordinates or axes. Pixels of a received image may be converted to a chrominance-luminance space such as CIELAB or YCbCr.

"Image forming device" is any device capable of rendering an image. The set of image output devices includes xerographic reproduction systems, multifunction devices, and the like. A laser or inkjet printer is one example of a color-marking device, which rendered an image from a received signal of image data by the visual integration of color inks deposited onto an imageable media substrate. An image out put device includes printers and multi-function machines (scan, copy, fax, and/or print). When an image is rendered, the signal of image data is reduced to a viewable form.

An "imageable substrate" is a substrate such as paper, film, cardstock, photographic paper, Mylar, and other printable surfaces.

EXAMPLE INFORMATION PROCESSING
SYSTEM AND IMAGE FORMING SYSTEM

Reference is now made to FIG. 1 which illustrates a block diagram of the major functional components for an information processing system, such as a computer, communicating with an image forming device.

In FIG. 1, client 102 is communicatively coupled through a wired or wireless network 120 to image forming device 132. The client has one or more installed applications 112 which enable a wide variety of computer-based tasks. Such applications are written in numerous programming languages, such as Adobe Reader, word processor, spread sheet, or similar. Operating system 110 is the master program that loads after the Hardware Abstraction Layer (HAL) and the Basic Input Output System (BIOS) 106 initializes. The operating system controls and runs hardware 104. Example operating systems include various iterations of Windows (3.1/95/98/ME/2000/NT/XP/Vista), Unix, Macintosh OS, OS/2, Sun Solaris, to name but a few. One or more device drivers which are hardware-specific code used to communicate between and operating system 110 and hardware peripherals such as a CD ROM drive or printer, such as image forming device 132 through HAL and BIOS through hardware 104. BIOS 106 is a set of low-level computer hardware instructions for communications between an operating system 110, device driver 108, and hardware 104. Image forming device 132 is PostScript-enabled with a PostScript engine 132. Optional Raster Image Processor (RIP) 142 and/or image processor(s) 128 are shown. These communicate with one or more print engines running on a hardware platform to form an image on an imageable substrate 144.

Figure 2:
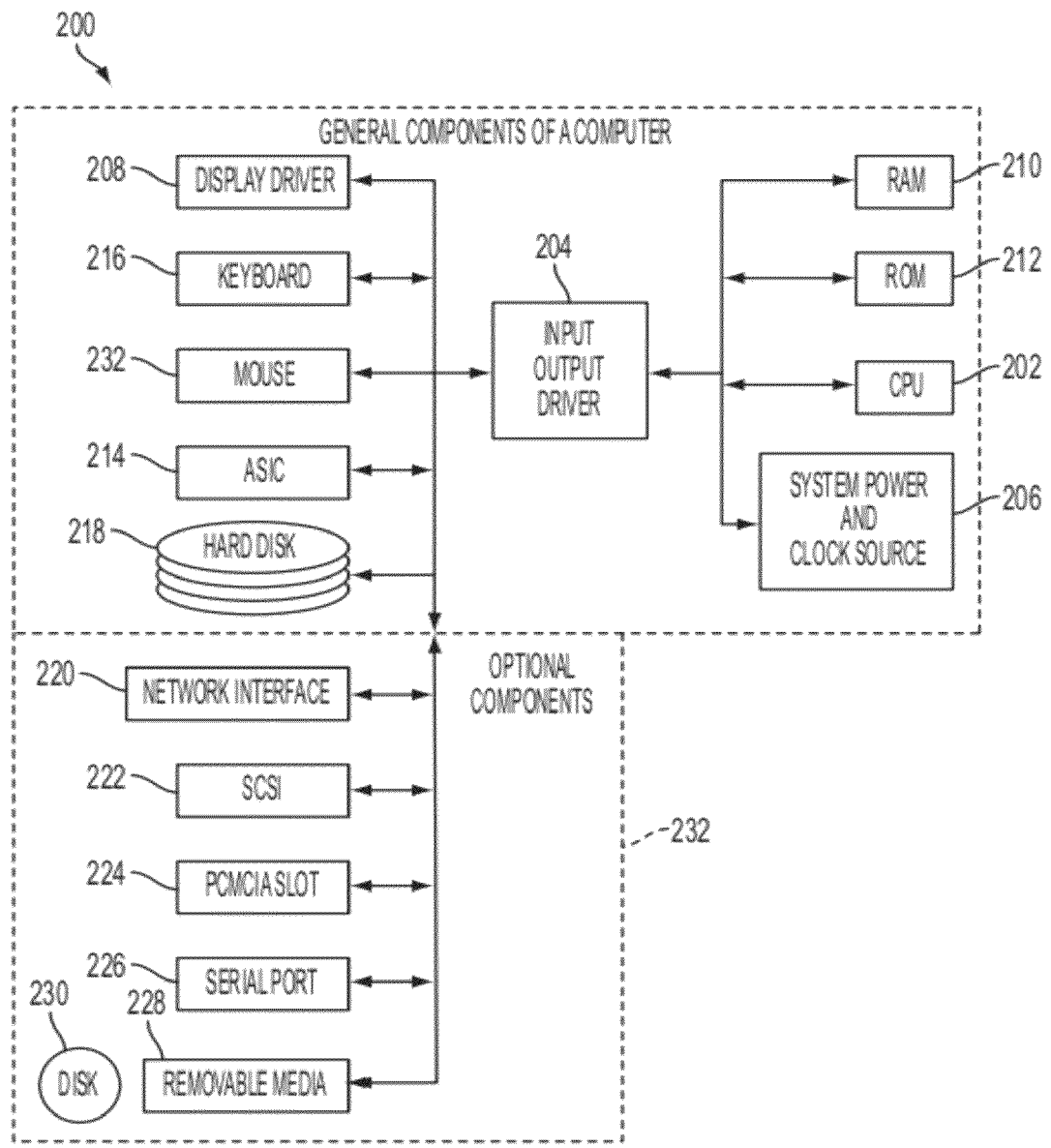
FIG. 2 illustrates a block diagram of the major electronic components for either the hardware of client (at 102) and/or that of the image forming device (at 132) of FIG. 1.

Reference is now made to FIG. 2 which illustrates a block diagram 200 of the major electronic components for either the hardware of client 102 and/or that of the image forming device 132 of FIG. 1.

The major electronic components include: a central processing unit (CPU) 202, an Input/Output (I/O) Controller 204, a mouse 232 a keyboard 216, a system power and clock source 206; display driver 208; RAM 210, ROM 212, ASIC 214 and a hard drive 218. These are representative components of a computer. Optional components for interfacing to external devices include Network interface 220, which provides connection to a computer network such as Ethernet over TCP/IP, or other popular protocol network interfaces, a Small Computer Systems Interface (SCSI) port 222 for attaching peripherals; a PCMCIA slot 224; and serial port 526. An optional drive 228 is also shown for loading or saving code to removable CDs and DVDs 230. The general operation of a computer comprising such major electronic components is well understood. As such, a further detailed discussion as to interfaces, interoperability, and the like, between such components has been omitted here for brevity.

OVERVIEW OF ONE EXAMPLE IMPLEMENTATION

The DeviceN color space allows the application to define a color space with an arbitrary number input planes. Traditionally, each plane represents an ink loaded into a printing press. If all of the requested "ink" names are not present on the device, then the device must use the emulation space provided to convert the incoming color requests using the provided color emulation procedure. With this method, PostScript files can contain images encoded for a Hexachrome press, but still print on a four color device. The color planes in the DeviceN color space do not have to represent inks at all. They can represent abstract data. For example, the transparency of the next three RGB planes.

Figure 3:
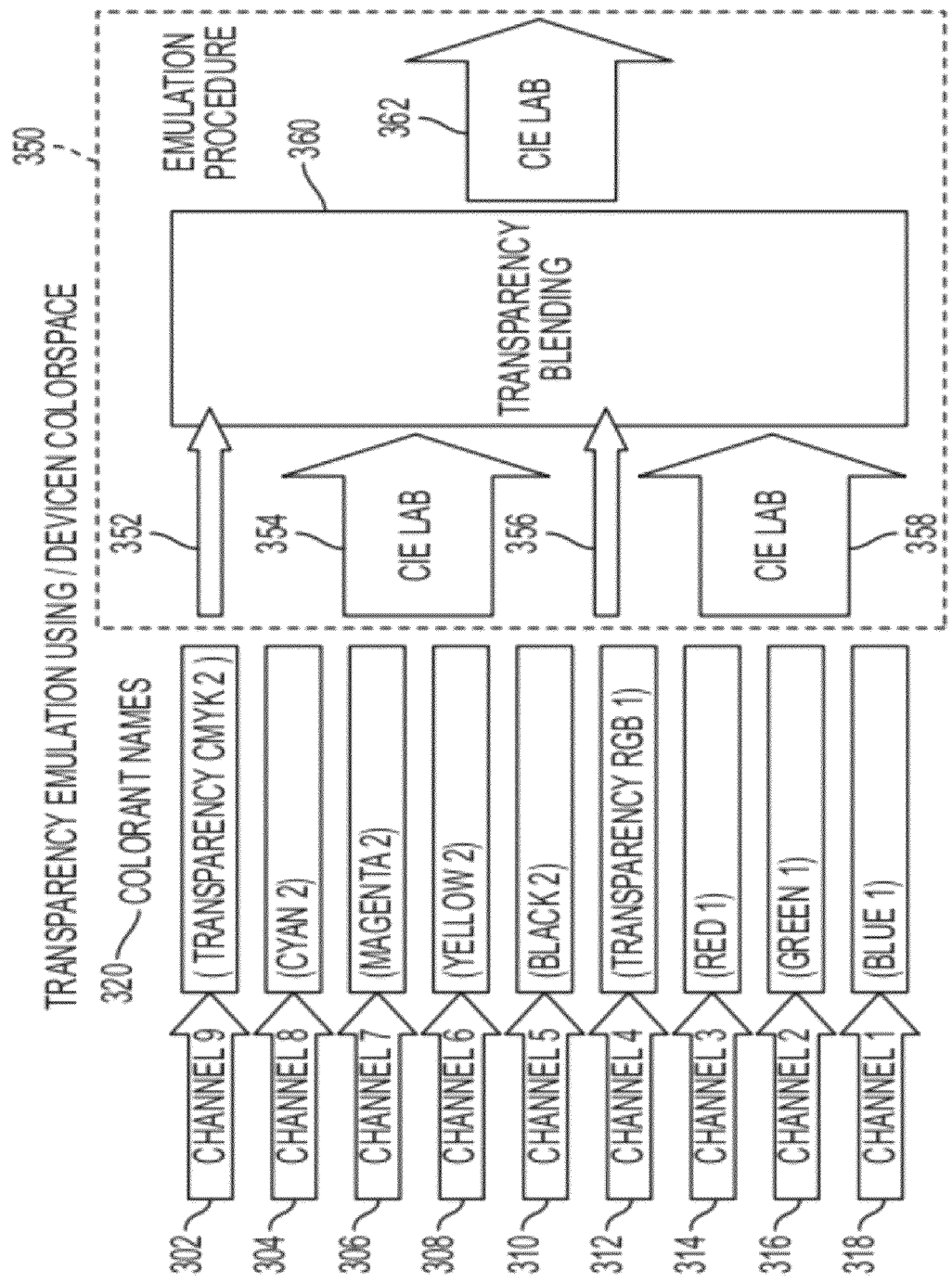
FIG. 3 is a diagram of input channels in two different color spaces; CMYK shown as color channels (at 302-310) and RGB shown as channels (at 312-318), along with a colorant value as a transparency value in the DeviceN color space model being flattened and blended (at 360)

Reference is now made to FIG. 3 which is a diagram of input channels in two different color spaces; CMYK shown as color channels 302-310 and RGB shown as channels 312-318. Note the existence of the transparency colorant channel 302 for CMYK and 312 for RGB. These are set by the application creating the print job in emulation subsystem 352. In this case there are two transparency colorant channels, and there can be one or more for any implementation, along with a colorant value as transparency values 352 and 358 from channel-9 302 for CMYK and channel-4 for RGB 312 in the DeviceN color space model being flattened and blended 360. In this example, the blending space is CIE Lab 354 and 358 with the CIE Lab color then processed via the Color Render Dictionary (CRD). It is important to note that any DeviceN color space can be used. All of the data present after flattening and blending 360 is sent as CIE Lab 362 to the PostScript-enabled device.

EXAMPLE FLOW DIAGRAM

Figure 4:
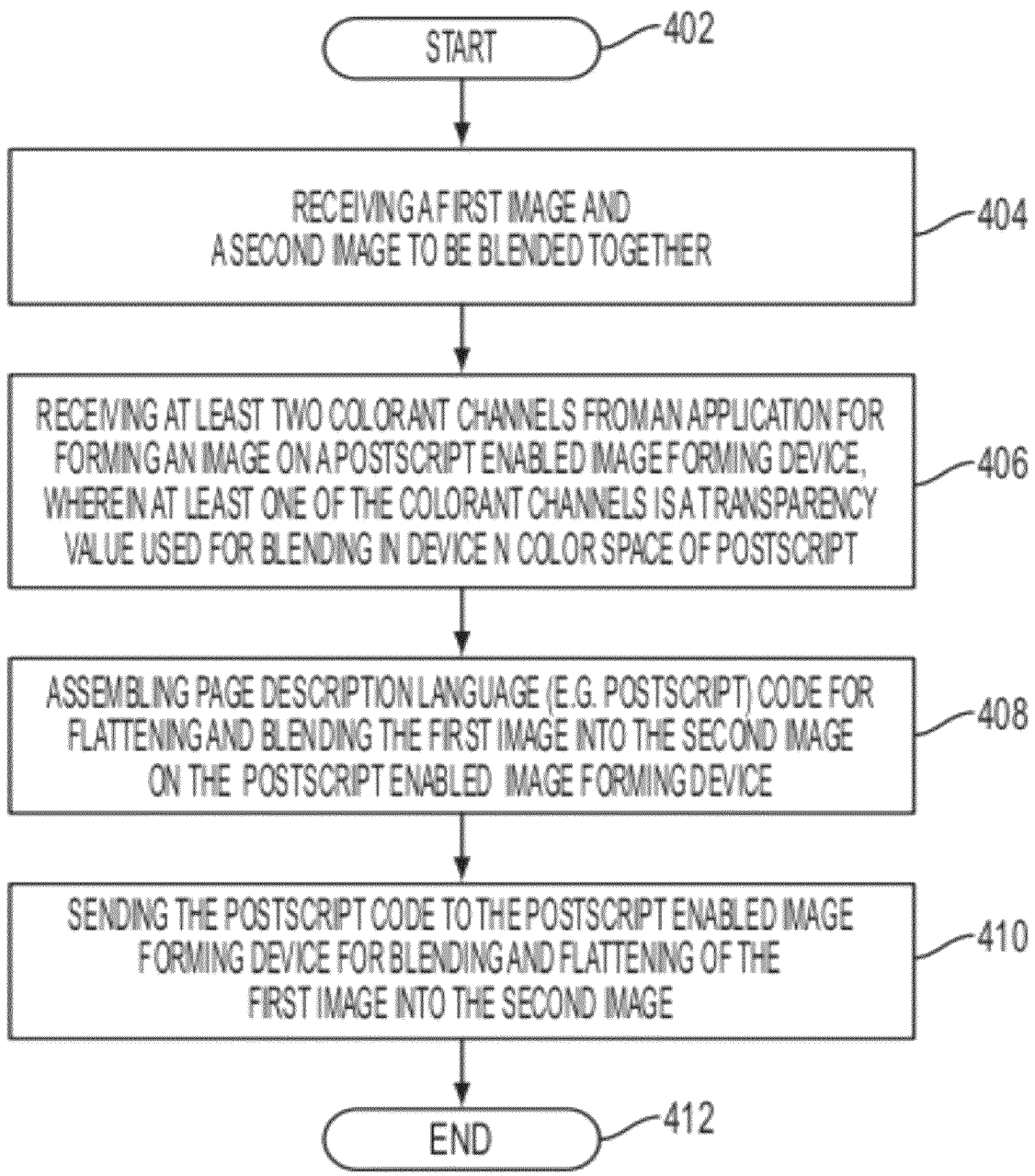
FIG. 4 is a flow diagram of one example embodiment of the present method for emulating transparency in a PostScript-enabled image forming device.

Reference is now made to the flow diagram of FIG. 4 which illustrates one example embodiment of the present method for emulating transparency in a PostScript-enabled device, such as a printer.

The method starts at 402 and immediately proceeds to step 404 wherein a first image and a second image to be blended together are received typically from application(s) 112, for example Adobe Reader. Other sources of images are within the true scope and spirit of the present invention including receiving images from other applications, accessing images from computer memory, receiving images from scanners and e-mail and more.

At 406, two or more colorant channels are received from an application, such as Adobe Reader, for forming an image on a PostScript-enabled device. At least one of the colorant channels is a transparency value used for blending in DeviceN Color Space of PostScript.

At 408, custom PostScript code is created for flattening and blending the first image into the second image on the PostScript-enabled device. Example of flattening and blending is described further in the section below entitled "Example Demonstration" along with the example PostScript code in FIG. 7.

At 412, the PostScript code is then sent to the PostScript-enabled device for flattening and blending of the first image into the second image in step 410 and the process ends.

In another embodiment, the first image and the second image are in different color spaces, and the custom PostScript code converts from one color space to another color space at the image forming device. Examples of color spaces found to be used advantageously by the current invention include RGB, CMYK, CIE Lab, calibrated device space, calibrated RGB, pantone, and spot color.

EXAMPLE DEMONSTRATION

Figure 5:
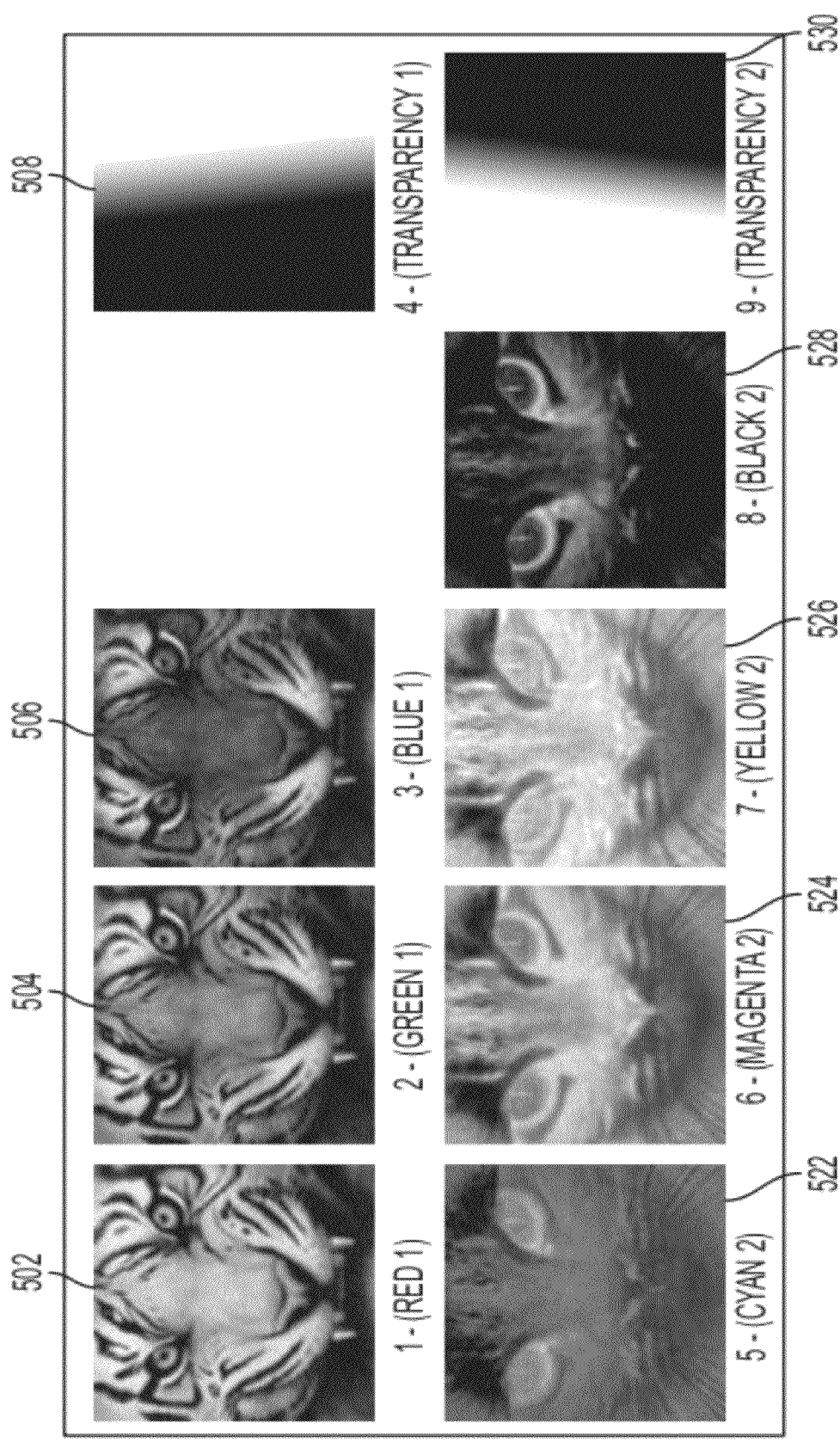
FIG. 5 is an example using the embodiments of FIGS. 3 and 4, implemented by the code in FIG. 7, for a series of input levels or planes of a first image and a second image being combined with transparency with the blending color space being DeviceCMYK.

Reference is now being made to FIG. 5 which is an example using the method of FIGS. 3 and 4, implemented by the code in FIG. 7, for a series of input levels or planes of a first image and a second image being combined with transparency with the blending color space being DeviceCMYK. Again, it should be clearly understood that any supported DeviceN emulation color space can be used.

The data is processed in layers. There are two layers here. The first (bottom-most) layer is the RGB tiger image shown as 502, 504, 506 and transparency value 508. The second (top-most) layer is the CMYK housecat image shown as 522, 524, 526, 528, and transparency value 530. In this example, there are nine channels of input corresponding to input channels 302 through 318 of FIG. 3. In this example, the transparency value 0 (black) is interpreted as fully transparent, and a transparency value of 1 (one) is interpreted as fully opaque. These values can be inverted within the true scope and spirit of the present invention.

The blending begins with paper white which, in one embodiment, is given by:

$$v'_0 \equiv \begin{bmatrix} 0 \\ 0 \\ 0 \\ 0 \end{bmatrix} \quad (1)$$

The RGB tiger color is converted into CMYK in a manner well established in the relevant arts. In another embodiment, a 3-D interpolated look-up table is used to perform the RGB to CMYK color conversion.

Once converted, the CMYK vector for the first layer (tiger image) can then be represented as:

$$v_1 \equiv \begin{bmatrix} c_1 \\ m_1 \\ y_1 \\ k_1 \end{bmatrix} \quad (2)$$

The blended color value, $v'_1$ for the first layer is given by:

$$v'_1 = (1-t_1)v'_0 + t_1 v_1 \quad (3)$$

where $t_1$ is the transparency of the first layer, such that $0 \leq t_1 \leq 1$.

The CMYK for the second layer (housecat image) can be represented as:

$$v_2 \equiv \begin{bmatrix} c_2 \\ m_2 \\ y_2 \\ k_2 \end{bmatrix} \quad (4)$$

The blended color value $v'_2$ for the second layer is given by:

$$v'_2 = (1-t_2)v'_1 + t_2 v_2 \quad (5)$$

where $t_2$ is the transparency of the second layer, such that: $0 \leq t_2 \leq 1$.

In general, a blended color value $v'_1$ for a given layer can be represented by the following:

$$v'_i = (1-t_i)v'_{i-1} + t_i v_i \quad (6)$$

where $t_i$ is the transparency value of the $i^{th}$ layer such that ($0 \leq t_1 \leq 1$).

It is important to distinguish that the CMYK space may not be the same CMYK blending space. In another embodiment, a 4-D interpolated lookup table is a useful general mechanism for performing this conversion.

Figure 6:
FIG. 6 shows a resulting image (at 602) having been flattened and blended by the embodiment of FIG. 5.

FIG. 6 shows a resulting image 602 having been flattened and blended by the embodiment of FIG. 5. Specifically, notice that the image of the house cat on the left side of FIG. 6 is blended according to the transparency value 530 of FIG. 5. Likewise, the notice that the image of the tiger on right side of FIG. 5 is blended according to the transparency value 508. The resulting image of FIG. 6 illustrates the blending of two images, the tiger in RGB color space with the house cat in CMYK color space, according to a transparency value in the colorant channels, i.e., 508 for the tiger and 530 for the house cat.

FIGS. 7 and 8 show example PostScript code implementing the flow diagram of FIG. 4 on a PostScript-enabled device. Here the convert_rgb_to_cmyk is a simple UCR/GCR routine, this assumes that RGB can be converted to CMYK in a non-colorimetric way. The CMYK image is assumed to be in the blending space. Both of these assumptions are not valid in a real world application. In FIG. 7, the example PostScript code is organized into a few functional areas. The routine "/convert_rgb_to_cmyk%rgb=>cmyk" converts the image in a RGB color space into a CMYK color space. Recall in this example, the tiger image is shown in FIG. 5 is in RGB color space and the house cat is in CMYK color space. The resulting blended image in this examples is in CMYK color space. Again, the present invention is not limited to blending in the CMYK color space and other color spaces are within the true scope and spirit of the present invention. The routine "/blend_4% v0 v1 v2 v3 b0 b1 b2 b3 T=>v0' v1' v2' v3'" implements Eqs. 1-6 above. Next, definitions used in the routines that define the color channels in each color space RGB and CMYK along with its corresponding transparency value are listed. For example, the definition "/DeviceCMYK" defines the color layers used in the blending. This is followed by more definitions and source encoded binary data for the first image and the second image as will be understood to a person familiar with PostScript code.

It should be clear at this point that none of the computation shown here could be performed on the host or client 102 of FIG. 1. This is an advantage because prior techniques required the flattening and blending to be performed on the imaging processing system or client. The flattening process requires color conversion. This requires knowing what colors the individual objects that make up the layers are to be printed on the page. This is frequently different than the color requested. There is the color the customer asks for, and a color that the customer thinks he/she wants, the color that will make them happy, and the color that they actually get. Sometimes all four of those colors are the same color, but more frequently, they are not. Many market segments don't want colorimetric matching. Subjective color matching is a requirement to be competitive in these markets. For example, an RGB color and a CMYK color with the same requested CIE Lab value, will most likely print on the page as two different colors. Many printer manufacturers have complex color behaviors built in their products. In order for flattening to happen correctly on the host, the host would have to be aware of (and emulate e) the color behavior of the printer.

In contrast, the present system and method sends all the layers down to the image forming device, such as a printer, and lets the printer do the flattening. The application provides the code to perform the "generic" flattening that would occur on the host. The printer, however, is aware of its own intrinsic color behavior, and can replace the "generic" flattening code with product-specific code. Some hints from the application would make this process a lot more reliable and easy. For example, the transparency layer name could include the CSA name from the AGM core code. With this mechanism, color results, equivalent to host based flattening, happen on the printer by default, while adding the additional capability of allowing each manufacturer to tune the flattening code to their specific product. Currently, applications have to perform flattening. This essentially comprises a two step process: rendering, and blending. Rendering is the part of the algorithm that computes color values for all layers for a particular point on a given page. Blending takes all layers and computes a single color value. Since PostScript does not fully support transparency, the rendering portion of the flattening must remain a function of the application. Whereas, the blending can be pushed down onto the printer.

Other Variations

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims.

It should also be understood that the method described in the flowcharts provided herewith can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine, that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

The teachings hereof can be implemented in hardware or software using any known or later developed systems, structures, devices, and/or software by those skilled in the applicable art without undue experimentation from the functional description provided herein with a general knowledge of the relevant arts.

Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein.

Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A method for emulating transparency with an image forming device capable of executing page description language program code for manipulating color in a DeviceN color space, the method comprising:

receiving, from an application for forming an image on an image forming device, a first image and a second image to be blended together in a DeviceN color space;

receiving at least two colorant channels from said application at least one of said received colorant channels having a transparency value;

assembling page description language program code for flattening and blending said first image into said second image based upon said transparency value; and sending said page description language program code to said image forming device, an execution of said code by said image forming device flattening and blending said first image into said second image to emulate transparency, wherein said page description language program code includes code for blending said first image into said second image, wherein a blended color value $v'_i$ for a second layer is given by:

$$v'_i = (1-t_2)v'_{i-1} + t_2 v_i$$

where $t_2$ is a transparency value of said second image such that $0 \leq t_2 \leq 1$.

2. The method of claim 1, wherein said first image being received in a first color space, and said second image being received in a second color space, and wherein said page description language program code includes code for converting said first color space to said second color space.

3. The method of claim 1, wherein said page description language program code further includes code for blending said first image into said second image in accordance with said transparency value such that, if said transparency value is 100%, only said first image is used and, if said transparency value is 0%, only said second image is used.

4. The method of claim 2, wherein said first color space is any of: RGB, CMYK, CIE Lab, calibrated device space, calibrated RGB, pantone, and spot color.

5. The method of claim 1, wherein said first image represents an imageable substrate upon which said second image is blended.

6. The method of claim 1, wherein said application for forming an image on an image forming device is Adobe Reader and wherein said page description language program code is PostScript.

7. An image forming device for emulating transparency, said device comprising:

a PostScript engine; and

PostScript code for execution by said PostScript engine for blending and flattening of a first image into a second image, said PostScript code being assembled with values for said first and second images and a least two colorant channels from an Adobe Reader software application for forming an image on a PostScript-enabled image forming device, at least one of said colorant channels having a transparency value for blending in a DeviceN color space, wherein said PostScript code includes code for blending said first image into said second image, wherein a blended color value $v'_i$ for a second layer is given by:

$$v'_i = (1-t_2)v'_{i-1} + t_2 v_i$$

where $t_2$ is a transparency value of said second image such that $0 \leq t_2 \leq 1$.

8. The image forming device of claim 7, wherein said first image is in a first color space and said second image in a second color space, said PostScript code including code for converting said first color space to said second color space.

9. The image forming device of claim 7, wherein said PostScript code further includes code for blending said first image into said second image in accordance with said transparency value such that, if said transparency value is 100%, only said first image is used and, if said transparency value is 0%, only said second image is used.

10. The image forming device of claim 7, wherein said first color space is any of: RGB, CMYK, CIE Lab, calibrated device space, calibrated RGB, pantone, and spot color.

11. A system for emulating transparency with an image forming device capable of executing page description language program code for manipulating color in a DeviceN color space, the system comprising:
a memory and a storage medium; and
a processor in communication with said storage medium and said memory, said processor executing machine readable instructions for performing:
receiving, from an application for forming an image on an image forming device, a first image and a second image to be blended together in a DeviceN color space;
receiving at least two colorant channels from said application at least one of said received colorant channels having a transparency value;
assembling page description language program code for flattening and blending said first image into said second image based upon said transparency value; and
sending said page description language program code to said image forming device, an execution of said code by said image forming device flattening and blending said first image into said second image to emulate transparency, wherein said page description language program code includes code for blending said first image into said second image, wherein a blended color value $v'_i$ for a second layer is given by:

$$v'_i = (1-t_2)v'_{i-1} + t_2 v_i$$

where $t_2$ is a transparency value of said second image such that $0 \leq t_2 \leq 1$.

12. The system of claim 11, wherein said first image being received in a first color space, and said second image being received in a second color space, and wherein said page description language program code includes code for converting said first color space to said second color space.

13. The system of claim 11, wherein said page description language program code further includes code for blending said first image into said second image in accordance with said transparency value such that, if said transparency value is 100%, only said first image is used and, if said transparency value is 0%, only said second image is used.

14. The system of claim 12, wherein said first color space is any of: RGB, CMYK, CIE Lab, calibrated device space, calibrated RGB, pantone, and spot color.

15. The system of claim 11, wherein said first image represents an imageable substrate upon which said second image is blended.

16. The system of claim 11, wherein said application for forming an image on an image forming device is Adobe Reader and wherein said page description language program code is PostScript.

* * * * *